United States Patent [19]
Younger

[11] Patent Number: 5,768,953
[45] Date of Patent: Jun. 23, 1998

[54] METHODS AND SYSTEMS FOR IMPROVING THE OPERATION OF TRANSMISSIONS FOR MOTOR VEHICLES

[76] Inventor: Gilbert W. Younger, 2621 Merced Ave., El Monte, Calif. 91733

[21] Appl. No.: 697,625

[22] Filed: Aug. 28, 1996

[51] Int. Cl.$^6$ .................................................. F16H 3/62
[52] U.S. Cl. .................................... 74/606 R; 475/116
[58] Field of Search ........................ 74/606 R; 477/120, 477/130, 131; 475/116

[56] References Cited

U.S. PATENT DOCUMENTS

| | | | |
|---|---|---|---|
| 5,540,628 | 7/1996 | Younger | 475/120 |
| 5,624,342 | 4/1997 | Younger | 475/127 |

OTHER PUBLICATIONS

Transgo, E40D–HD2 "Reprogramming Kit"(TM), pp. 1–6, 1995.
Ford Motor Co., E40D Automatic Transmission Reference Manual, pp. 1–110, 1992.

*Primary Examiner*—Khoi Q. Ta
*Attorney, Agent, or Firm*—Mark P. Stone

[57] ABSTRACT

The present invention is directed to methods and systems for improving the operation of a transmission for an automotive vehicle, and in particular the transmission as installed by the original automobile manufacturer. The methods and systems of the present invention modify the original hydraulic fluid circuits of the automotive transmission provided by the automobile manufacturer to enable the transmission to manually select any available ratio at any time, to select first gear at any time, and to enable the transmission to produce quick applies during upshifts and fast releases during downshifts for improved performance and heavy duty use with only minimum ratio sharing or overlap during gear changes. The modification of the original automotive transmission to achieve these goals includes adjustment of the hydraulic fluid circuits by providing a new 1-2 shift valve, by providing new hydraulic flow circuits, by discontinuing use of existing hydraulic circuits, by enlarging the size of pre-existing orifices and by plugging other orifices, and by adjusting pre-existing spring and pressure values; all of which adjust the fluid flow and operation of the original factory installed automotive transmission in accordance with the basic objectives of the present invention.

20 Claims, 12 Drawing Sheets

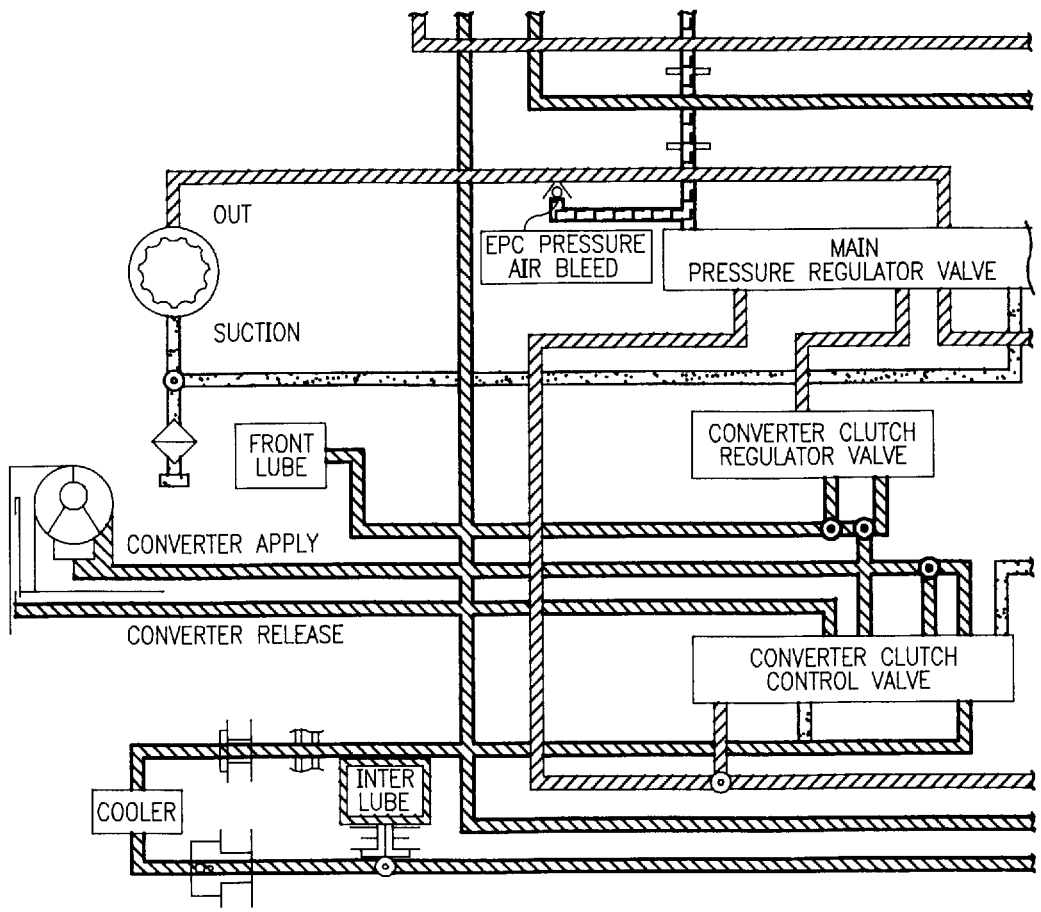
FIG. IC
PRIOR ART

▨ LINE
▨ EPC (T.V.)
▨ SRV.
▨ CONV./COOL
▨ EXH.
▨ LUBE
▨ LINE MOD.
▨ L/R MOD.

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles of the type installed by the original equipment manufacturers. The invention is particularly directed to the improvement and modification of the automotive transmissions commonly known as the "E40D" which is "factory installed" in automotive vehicles manufactured by Ford Motor Company.

The present inventor owns U.S. Pat. No. 5,253,549, issued Oct. 19, 1993 and entitled "Methods And Systems For Improving The Operation Of Automatic Transmissions For Vehicles"; U.S. Pat. No. 4,790,938, issued on Dec. 13, 1988 and entitled "Filter For Removing Particulate Matter From Fluid Within A Movable Body"; U.S. Pat. No. 4,711,140, issued Dec. 8, 1987 and entitled "Throttle Valve System For Automatic Transmission"; U.S. Pat. No. 4,449,426, issued on May 22, 1984 and entitled "Laminated Separator Plate Means For Recalibrating Automatic Transmission"; U.S. Pat. No. 5,540,628, issued Jul. 30, 1996 and entitled "Methods And Systems For Improving The Operation Of Transmissions For Motor Vehicles"; U.S. patent application Ser. No. 08/494,844, filed Jun. 26, 1995 and entitled "Methods And Systems For Improving The Operation Of Transmissions For Motor Vehicles", U.S. patent application Ser. No. 08/515,098, filed Aug. 14, 1995 and entitled "Methods And Systems For Improving The Operation Of Transmissions For Motor Vehicles", and U.S. patent application Ser. No. 08/595,810, filed Feb. 2, 1996 and entitled "Methods And Systems For Improving The Operation Of Transmissions For Motor Vehicles". The basic operation of transmissions for automotive vehicles and improvements thereto, are discussed in the aforementioned patents and patent applications, and these patents and patent applications are expressly incorporated by reference into the disclosure of the present patent application.

The basic principles of operation of the factory installed Ford Motor Company transmission for automotive vehicles, including the specific modes of operation thereof and the hydraulic circuits and interrelationship of hydraulic circuits, are well known to those skilled in the automotive transmission art. Attention is respectfully invited to the text entitled E40D *Automatic Transmission Reference Manual* (1992) published by The Ford Motor Company, said publication describing in detail the operation of the "factory installed" E40D Ford transmission, including a discussion of the structure, the hydraulic circuits, and the interrelationship between the structure and the hydraulic circuitry and fluid flow during normal operation of the transmissions in automotive vehicles. The disclosure of the aforementioned publication in its entirety is expressly incorporated by reference into the disclosure of the present patent application as disclosing and illustrating background material known to those of ordinary skill in the automotive transmission art.

A publication entitled "TRANSGO E40D-HD2 REPROGRAMMING KIT" (including 2 pages designated as "E40D—STICK VALVE BODY"), is an instruction sheet describing the manner in which an automotive transmission mechanic implements the modifications to the E40D Ford factory installed transmission to achieve the goals of the present invention. The disclosure of the aforementioned instruction sheet (hereinafter referred to as the Transgo Publication) in its entirety is also expressly incorporated by reference into the present patent application.

In the original design of the E40D "factory installed" transmission, the first gear ratio cannot be obtained above a vehicle speed of approximately 34 miles per hour. (See the aforementioned Ford Motor Company publication). A primary object of the present invention is to enable the driver of a vehicle having an E40D Ford transmission to select first gear at any time, thereby enabling the driver to obtain a "first" gear ratio whenever the gear selector lever is placed in the "1" position without regard to the actual vehicle speed. This objective is accomplished by modification of the structure and operation of the existing hydraulic circuits of the original transmission and the addition of a new hydraulic circuits to the original transmission.

It is also desirable to modify the "factory installed" automotive transmission to result in quick application during upshifts and quick release forces during downshifts with minimum ratio sharing (overlap) during gear changes, for improved performance particularly when the vehicle is in heavy duty use. This object is obtained by varying the structure and operation of the hydraulic circuits of the original transmission to enlarge or reduce existing orifices to control the apply and release fluid flow through the hydraulic circuits, in conjunction with the modification of different spring and pressure values of the pre-existing hydraulic circuits of the factory installed transmission.

A further object of the present invention is to modify a "factory installed" E40D transmission, when designed for stick shift manual operation, to enable section of any gear ratio at any time, both with and without electronic controls.

Other objects, improvements and advantages of the present invention will become apparent to those skilled in the art from the following description in conjunction with the drawings.

SUMMARY OF THE INVENTION

Methods, apparatus and systems are provided for modifying the structure, operation, and functional relationship between structure in "factory installed" transmissions for automotive vehicles. In accordance with the present invention, the transmission identified as Model E40D installed in vehicles produced by The Ford Motor Company are modified to enable the driver to select any available ratio at any time, and in particular to enable the driver to obtain a first ratio whenever the gear selector is placed in the first position. In the original "factory installed" transmission, the first ratio cannot be obtained for vehicle speeds exceeding approximately 34 miles per hour. The original transmission is modified to achieve this result by removing an existing 2-3 shift valve from the original hydraulic circuitry, and replacing it with a new 2-3 shift valve providing a fluid flow path through the valve itself to control fluid pressure applied to one side of the "1-2" shift valve to maintain or downshift the transmission to first gear ratio without regard to vehicle speed. The modification to the stick shift manual operation of the transmission enabling the selection of any gear ratio at any time without electronic controls includes the addition of a new 3-4 shift valve using the original spring, and the addition of a new 2-3 shift valve to adjust the pressure applied in the factory installed transmission to maintain maximum mainline pressure without electronic controls.

The present invention also modifies the aforementioned "factory installed" automotive transmission by producing quick "applies" and "releases" with minimum ratio sharing (overlap), which is advantageous in improving performance when the vehicle is used for heavy duty applications. These further modifications to the operation of the original transmissions are achieved by enlarging or reducing (or plugging) orifices in the original hydraulic circuitry to modify fluid flow therethrough for controlling the apply and release fluid flow. Additionally, adjustments are made to spring and pressure values of the original transmission hydraulic circuitry for increasing minimum and maximum mainline pressure.

Accordingly, the object of the present invention is to modify the operation of existing "factory installed" automotive transmissions, and in particular the Ford E40D transmission, to result in changes to the hydraulic circuitry and fluid flow therethrough to enable the driver of the vehicle to select any available ratio at any time in a stick shift manual operating mode without electronic controls, to select first gear ratio without regard to vehicle speed, and to produce quick "applies and releases" which are particularly advantageous for heavy duty applications. Other advantages and improvements of the methods, systems and apparatus of the present invention will become apparent to those skilled in the automotive transmission art from the following discussion in conjunction with the enclosed drawings.

BRIEF DESCRIPTION OF THE DRAWINGS

FIGS. 1A–1D illustrate the prior art hydraulic circuitry of the "factory installed" Ford E40D automotive transmission for First Gear position;

DESCRIPTION OF THE BEST MODES FOR CARRYING OUT THE INVENTION

The present invention is directed to improvements and modifications to existing "factory installed" automotive transmissions, and in particular the E40D transmission of The Ford Motor Company, Dearborn, Mich. The objects of the present invention include modification of the structure, hydraulic circuitry, interrelationship of structure and fluid flow patterns through the hydraulic circuitry of the original factory installed transmission for the purpose of 1). enabling a driver to select first gear ratio without regard to vehicle speed, 2). enabling a driver to select any available ratio at any time with or without electronic controls in stick shift manual operation, and 3). controlling fluid flow through the hydraulic circuitry to produce quick apply forces during upshifts and quick releases during downshifts with minimum ratio sharing (overlap) during gear changes. The modifications to the original operation and hydraulic circuitry of the "factory installed" automotive transmission are accomplished by eliminating structure including original valves, adding structure including new valves, adding new hydraulic circuits to the overall circuitry, discontinuing use of existing circuits by plugging; and modifying flow of hydraulic fluid through existing hydraulic circuitry by enlarging or reducing the size of fluid flow orifices and adjusting existing spring and pressure values.

The disclosure of the Applicant's prior U.S. Pat. Nos. 5,253,549; 4,790,938; 4,711,140; 4,449,426; and 5,540,628 are expressly incorporated by reference into the disclosure of the present patent application. The disclosure of Applicant's currently pending Ser. Nos. 08/494,844, filed Jun. 26, 1995; 08/515,098, filed Aug. 14, 1995; and 08/595,810, filed Feb. 2, 1996, are also expressly incorporated by reference into the disclosure of the present patent application. Additionally, the disclosure of the aforementioned Ford Motor Company operating manual entitled *Ford E40D Automatic Transmission Reference Manual* (1992), which discloses in detail the structure and operation of the "factory installed" Ford E40D automotive transmission, is expressly incorporated by reference into the disclosure of the present patent application as describing and illustrating basic operating principles and the hydraulic circuitry of the known and conventional automotive transmissions which constitute background information to the improvements of the present invention. The aforementioned Transgo publication entitled "TRANSGO E40D-HD2 REPROGRAMMING KIT" and "E40D—STICK VALVE BODY", which describes the manner in which the factory installed E40D automotive transmissions are modified by transmission mechanics in accordance with the present invention, is also expressly incorporated by reference herein.

Figure 1A:
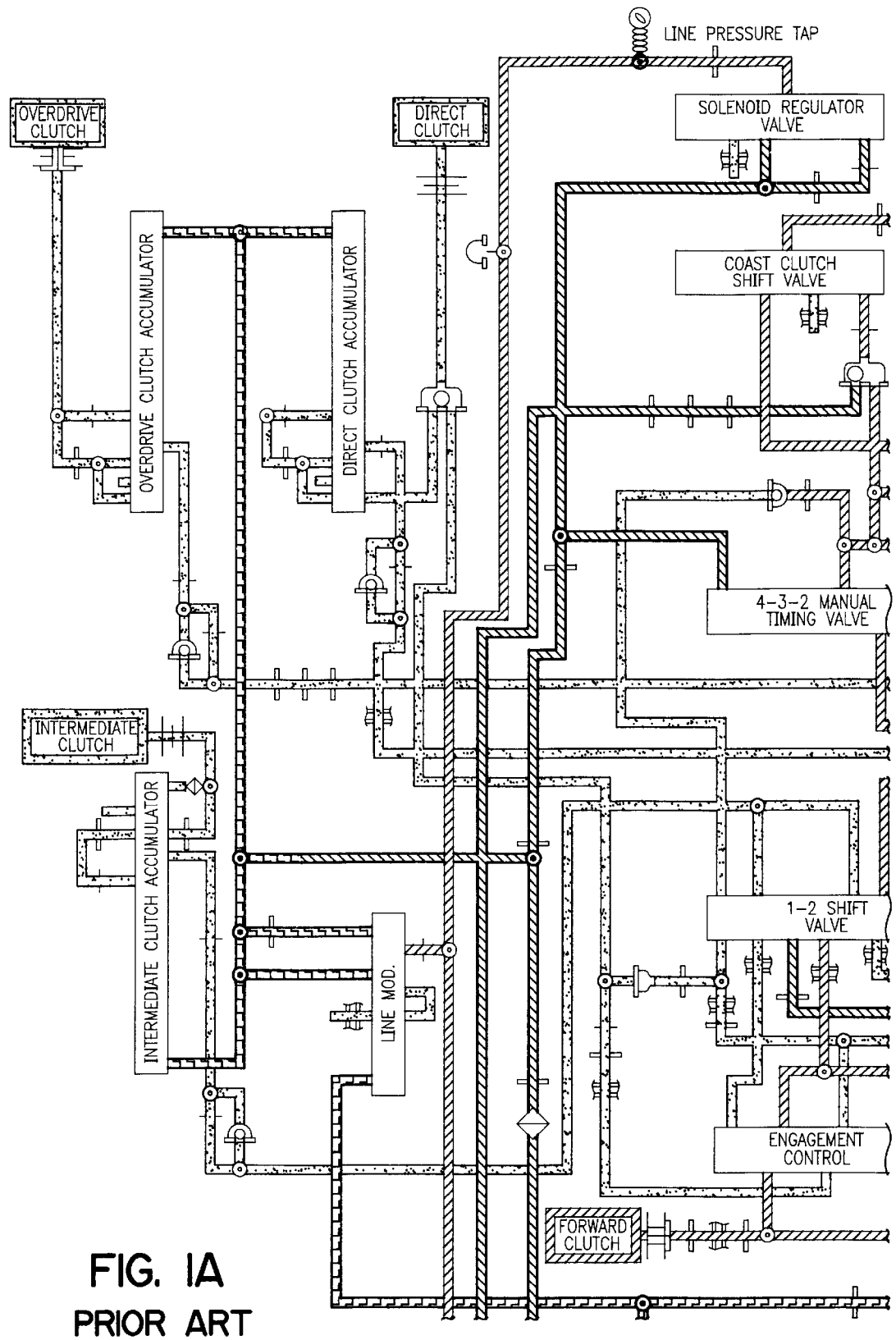
Figure 1B:
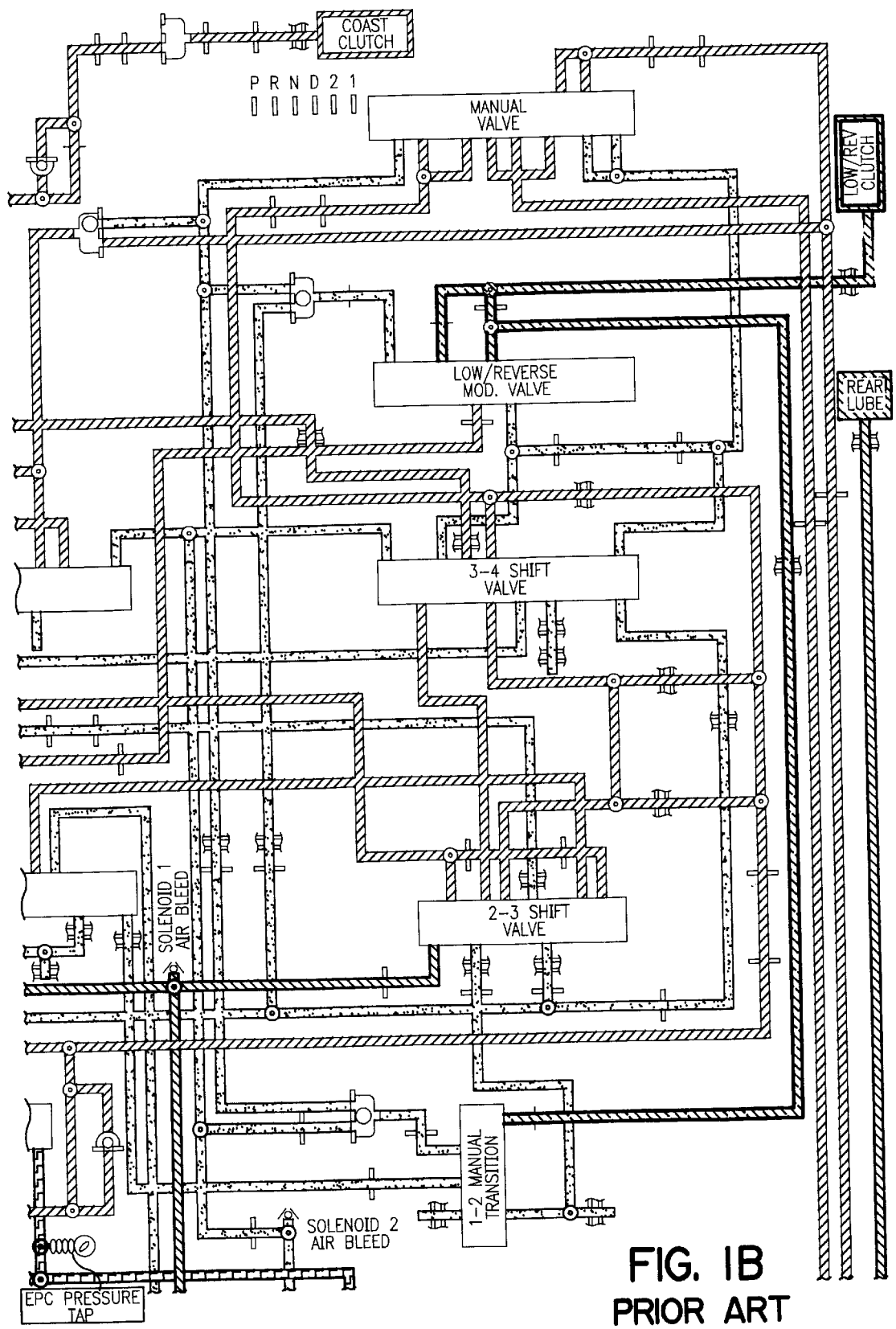
Figure 1D:
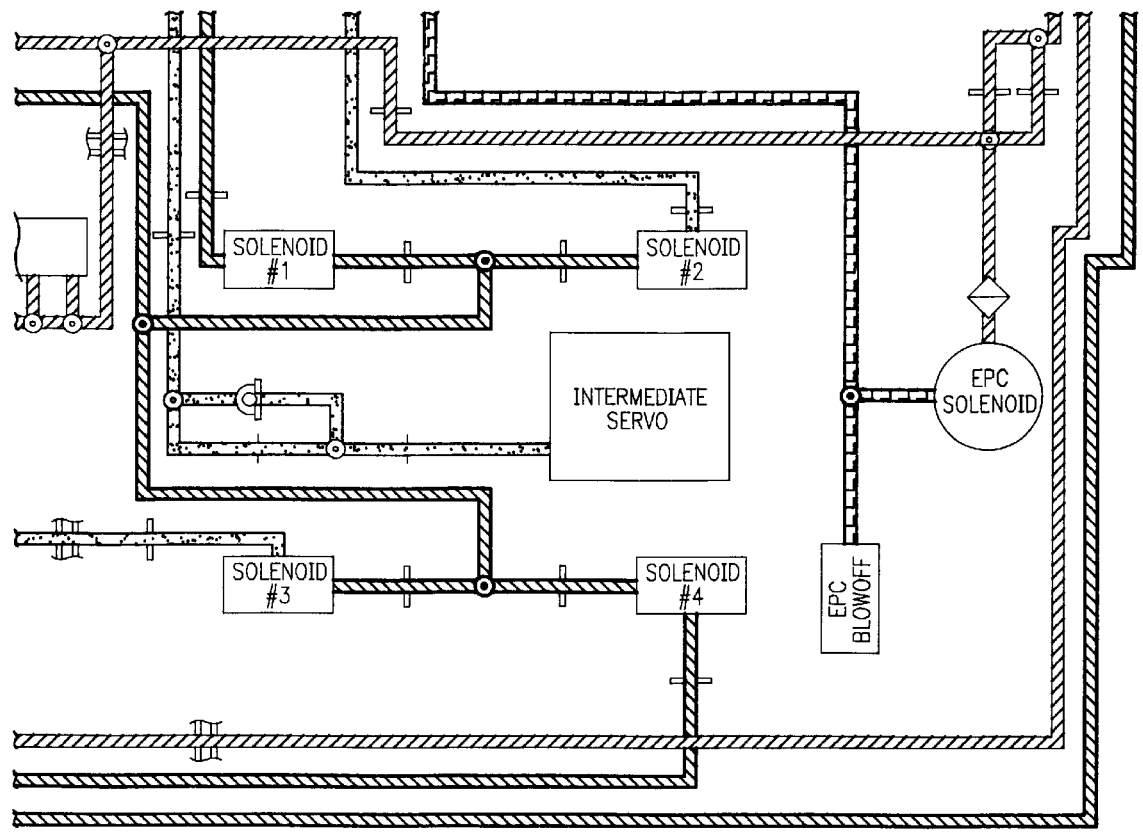
Figure 2A:
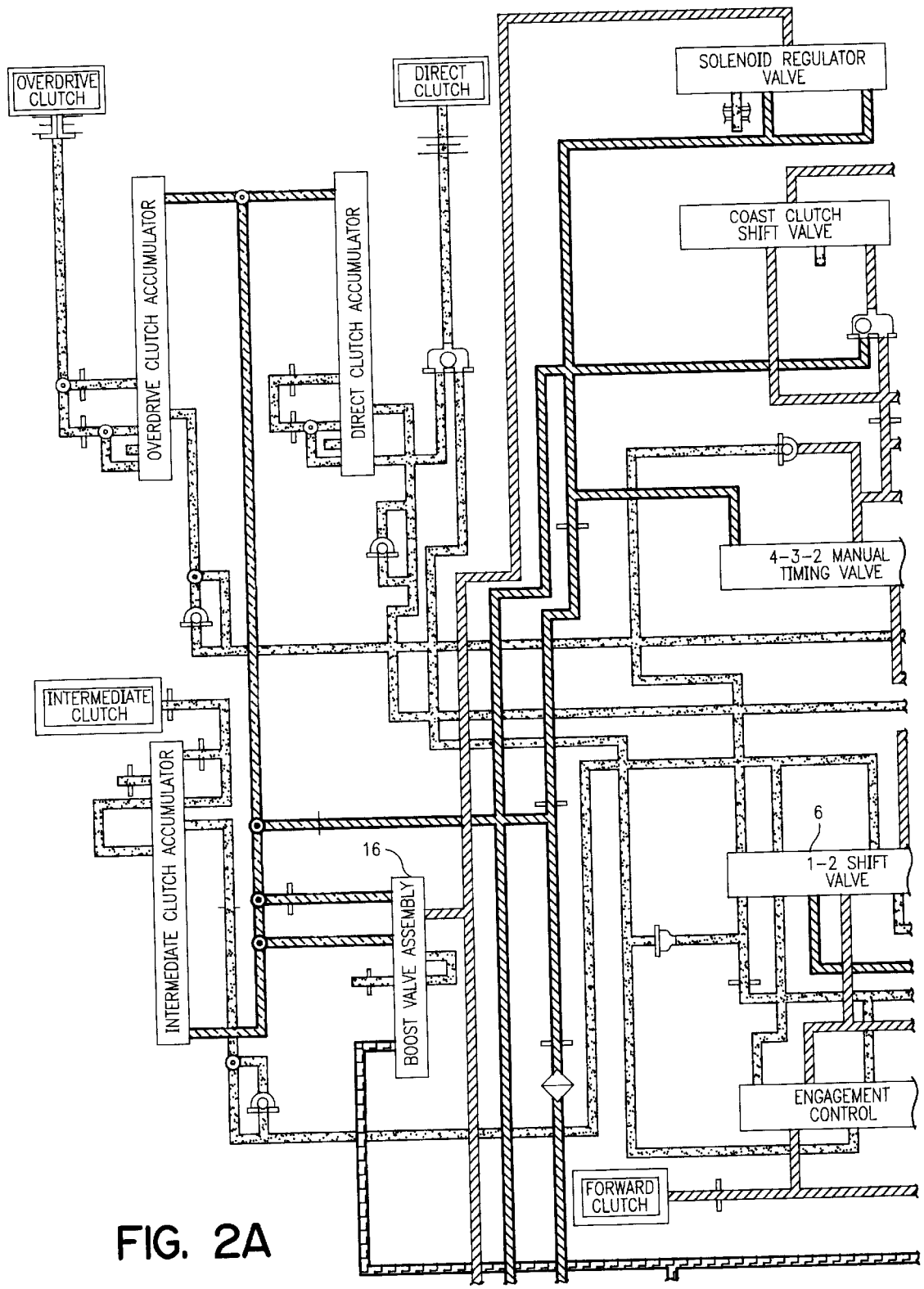
FIGS. 2A–2D illustrates the hydraulic circuitry of the Ford E40D automotive transmission in the "1 Position First Gear", as modified in accordance with the present invention.
Figure 2B:
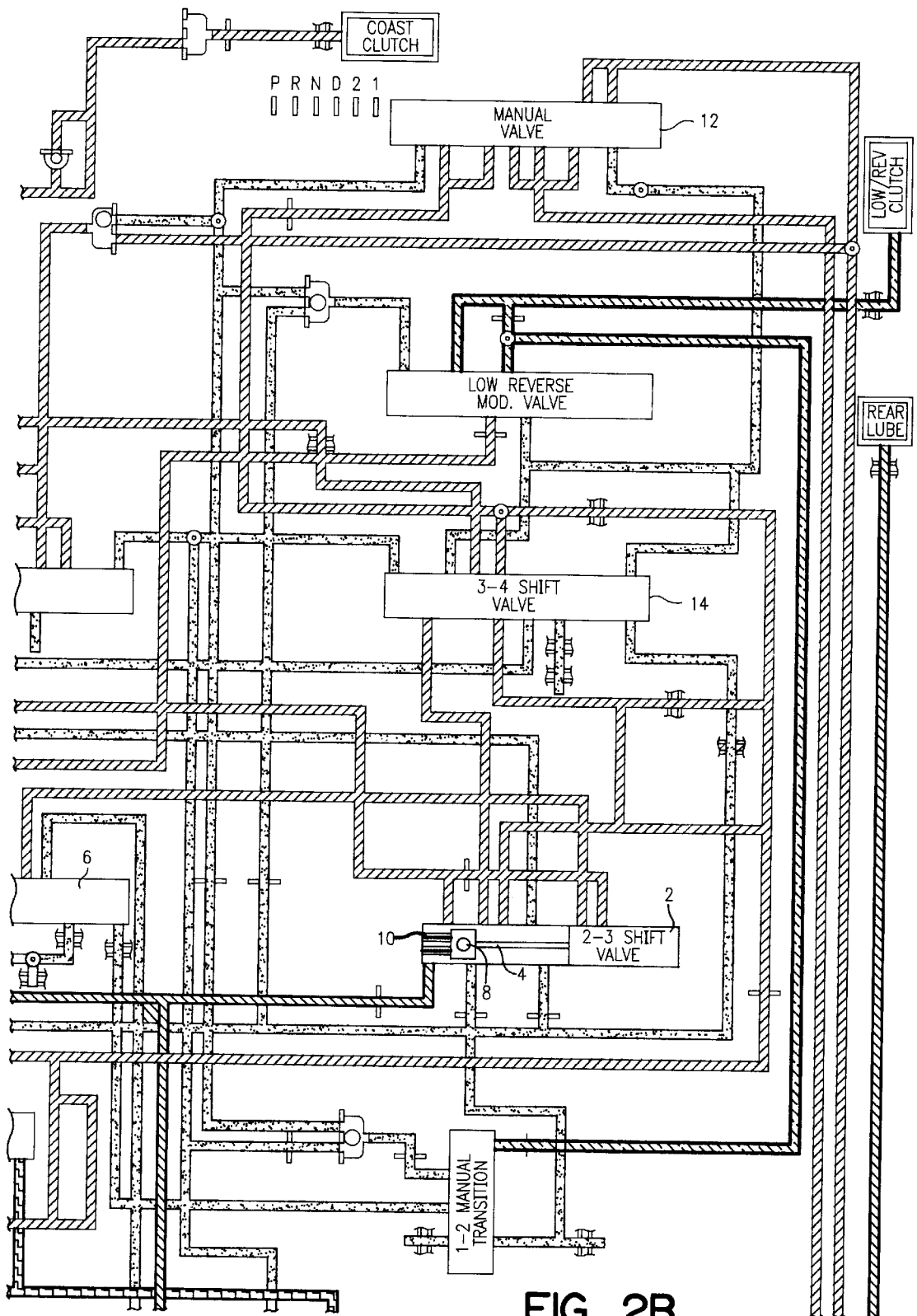
Figure 2C:
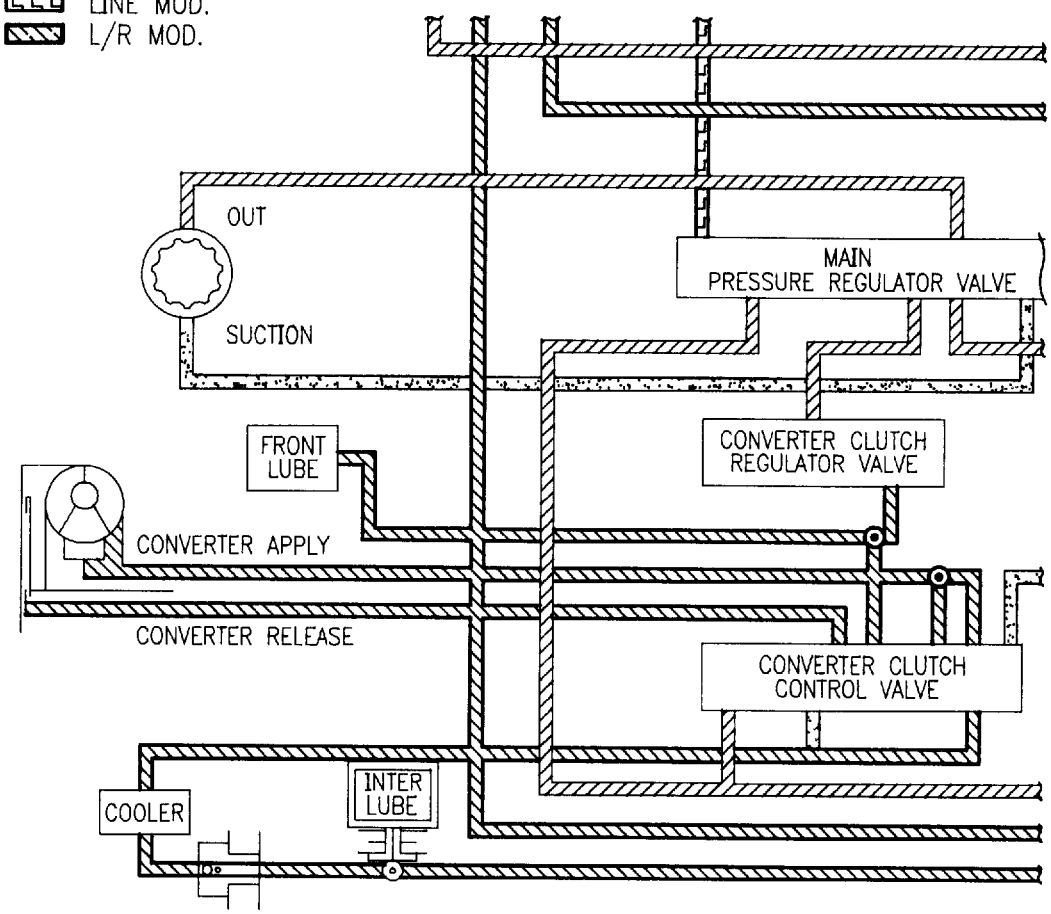
Figure 2D:
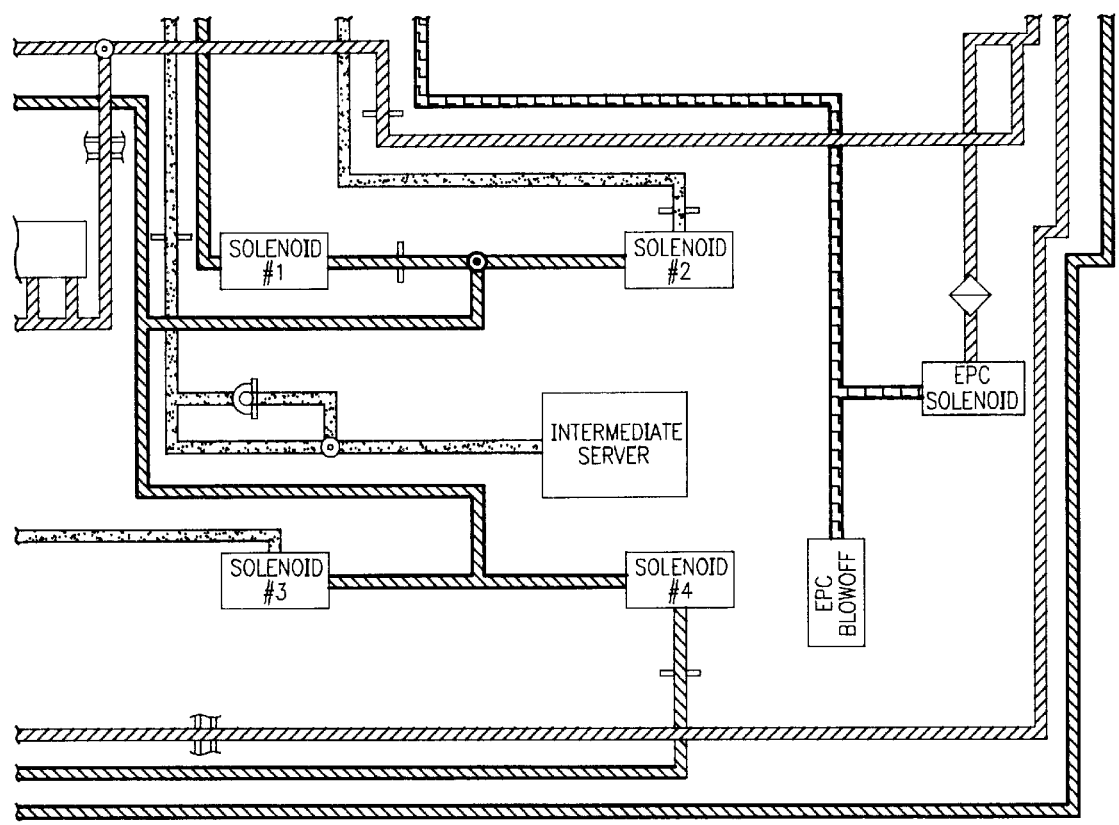
Figure 3A:
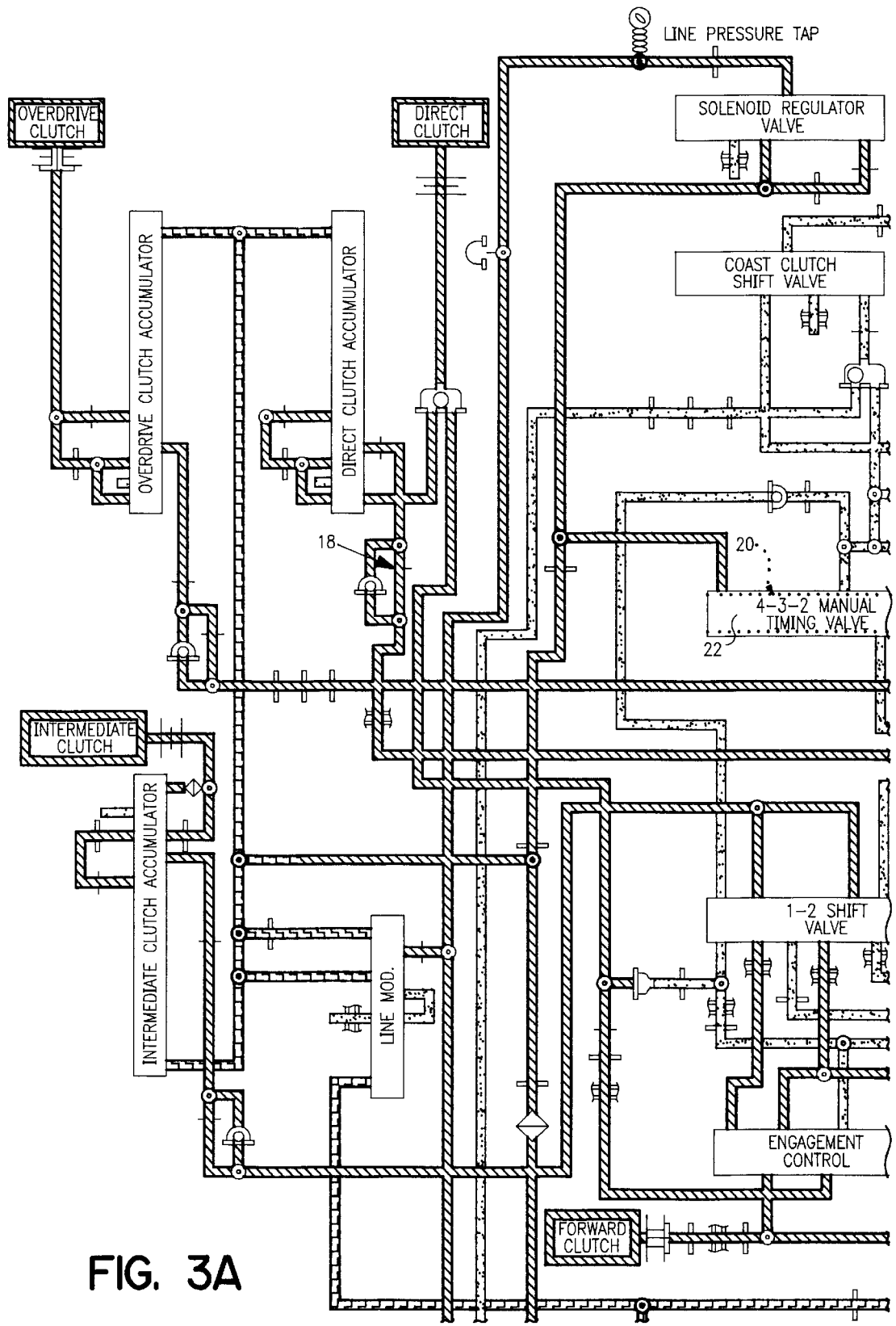
FIGS. 3A–3D illustrates the hydraulic circuitry of the Ford E40D transmission in the "D Position Fourth Gear", as modified in accordance with the present invention.
Figure 3B:
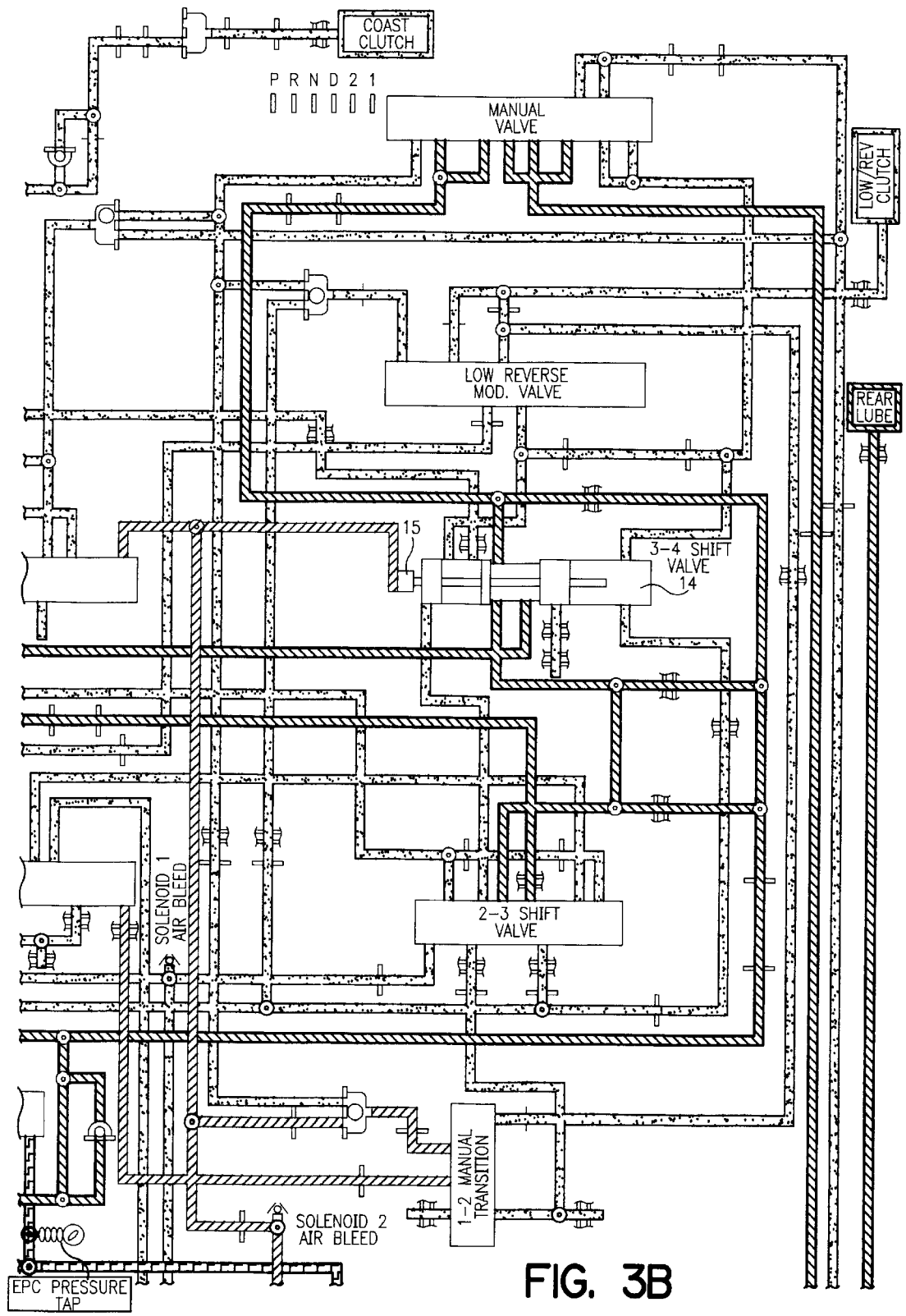
Figure 3C:
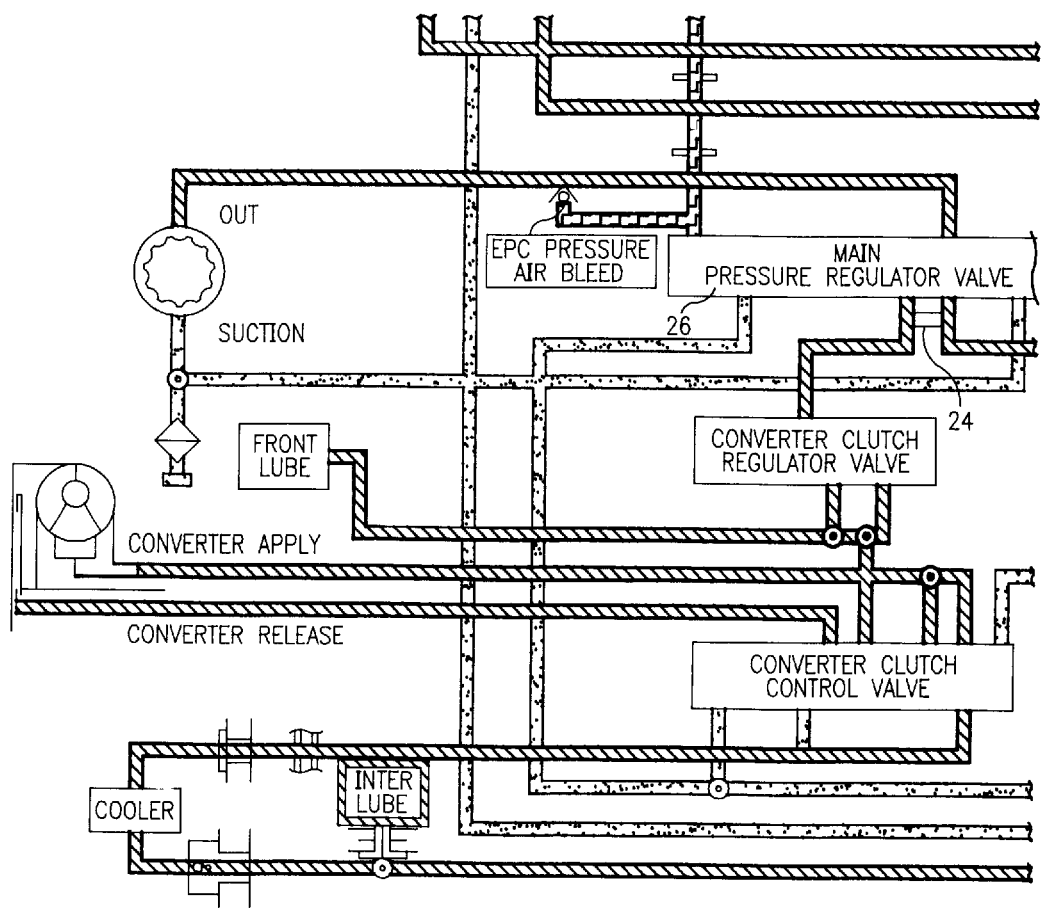
Figure 3D:
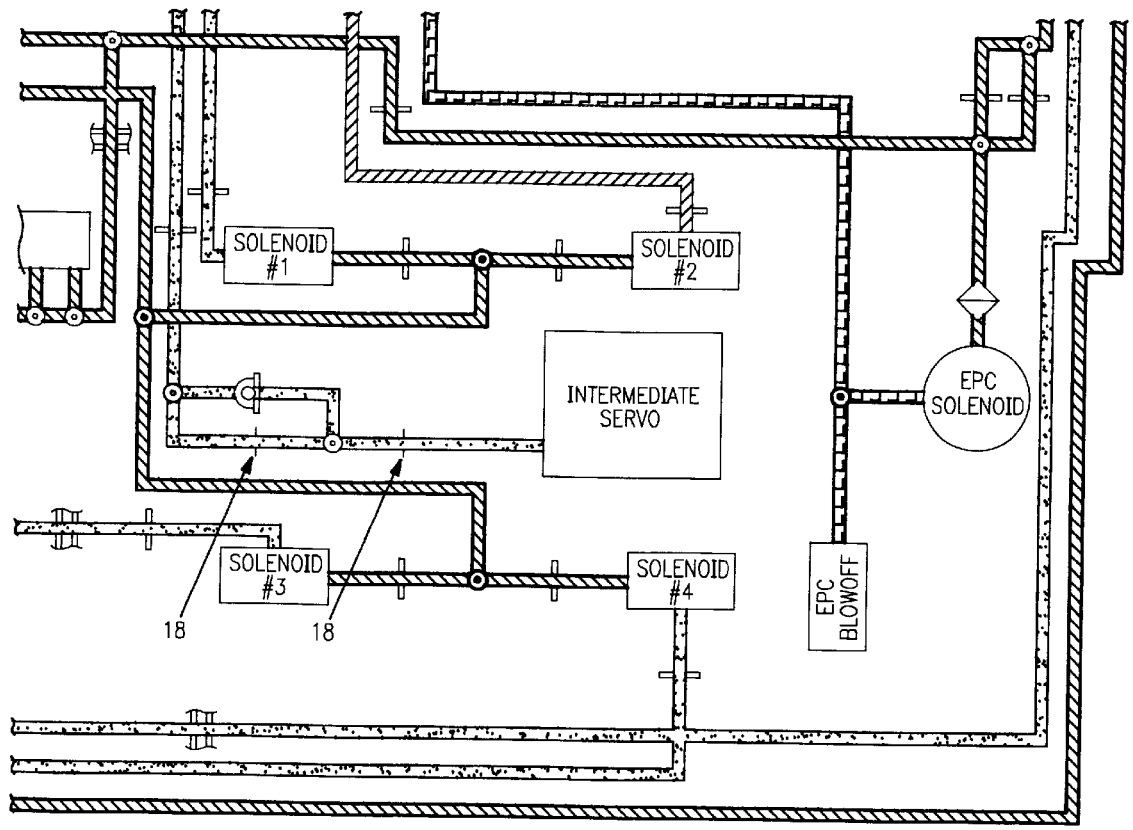

FIG. 1 of the drawings (shown as FIGS 1A–1D) illustrates the prior art operation of the "factory installed" E40D transmission in First Gear position. FIGS. 2–3 (shown as FIGS. 2A–2D, and 3A–3D, respectively illustrate the hydraulic circuitry of the E40D automotive transmission, as modified from the "factory installed" mode of operation in accordance with the present invention.

The prior art operation of the "factory installed" E40D automotive transmission will be briefly described as follows. Attention is directed to the *E40D Automatic Transmission Reference Manual*, Ford Motor Company, (1992) for a more detailed description of the operation of the "factory installed" transmission including the hydraulic circuitry thereof First Gear (referred to as "First", "Manual First", or "Manual One") is available to the driver when vehicle operating conditions require maximum engine compression to slow the vehicle, or maintain maximum transfer of engine torque to the vehicle drive shaft. Under normal operating conditions in First Gear, the transmission is prevented from upshifting past first gear. When Manual First is selected while operating in either second, third or fourth gears, the factory installed transmission will not immediately downshift into first gear. Vehicle speed must be below approximately 34 mph before the factory installed transmission will downshift into first gear. When the vehicle is operating above this speed, the transmission will operate in a Manual First-Second Gear condition until the vehicle speed decreases sufficiently. A downshift to first gear is controlled electronically by the PCM (Powertrain Control Module). The PCM will not energize a shift solenoid to initiate the 2-1downshift until vehicle speed is below approximately 33 mph. Above this speed, the transmission will operate in a Manual First-Second gear condition until vehicle speed decreases below this rate. In Manual First, as in Manual Second, the factory installed transmission is electronically and hydraulically prevented from operating in third or fourth gears. FIG. 1 of the drawing illustrates operation of the "factory installed" E40D transmission in the First Gear postion. The mode of operation of this factory installed transmission, which is known to those skilled in the art, is described in detail in the aforementioned Ford publication to which further reference is made.

FIGS. 2–3 of the drawing illustrate the hydraulic circuity of the "factory installed" E40D transmission, as modified in accordance with the preferred embodiments of the present invention. The "factory installed" 2-3 shift valve is replaced by a new 2-3 shift valve designated by reference numeral 2 in FIGS. 2–3 of the drawing. As illustrated by FIG. 2, a fluid flow path designated by reference numeral 4 is defined through the center of the valve 2. Low oil flows through the passageway 4 to the left end of the valve 2, applying a pressure thereto. The applied pressure at the left end of the valve 2 actuates the valve causing it to move in a rightward direction when a gear selector is placed in a "1" or First Gear position. The valve 2 is thus held in a downshifted position to the right (as shown in FIG. 2) permitting low oil to flow to the left end of a "1-2" shift valve designated by reference numeral 6 through the low oil passageway coupling valves 4 and 6 in fluid flow relationship. The pressure of the low oil applied to the left end of the valve 6 causes this "1-2" shift valve to downshift the transmission to first gear without regard to the actual speed at which the vehicle is travelling (i.e., without regard to the rotational speed of the engine) when the gear selector is moved into the "1" or First Gear selector position. In this manner, First Gear can be obtained at any vehicle speed, and not just at vehicle speeds below 34 m.p.h. as is the case with the "factory installed" transmission.

In the factory installed transmission, to prevent the engine from attaining a rotational speed greater than that corresponding to a vehicle speed of approximately 34 m.p.h. when the gear selector is in the "1" or First Gear position, the "1-2" shift valve was allowed to upshift (move in a leftward direction as illustrated in FIG. 1 of the drawing) by electrically de-energizing a solenoid associated with the factory installed "1-2" shift valve. In this manner, solenoid oil is exhausted from the left end of the "1-2" shift valve reducing the fluid force applied to that end of the valve, thereby allowing a spring acting on the right end of the valve to exert a sufficient force to upshift the valve by moving it in a leftward direction. In accordance with a further aspect of the present invention, the hydraulic system of the "factory installed" E40D transmission is modified to prevent the "1-2" shift valve, designated by reference numeral 6 in FIG. 2 of the drawing, from upshifting (moving leftward as shown in the drawing) when the gear selector is in the "1" or First Gear position. This modification is accomplished by feeding low oil through the passageway 4 defined through the center of the "2-3" shift valve, designated by reference numeral 2 in FIG. 2 of the drawing, to the left end of the "1-2" shift valve, designated by reference numeral 6 in FIG. 2 of the drawing. As illustrated in the drawings, appropriate fluid flow passageways are provided for coupling shift valve 2 (and the passageway 4 defined in the center thereof) in fluid flow relationship to the left end of the shift valve 6. The fluid pressure applied to the left end of the valve 6 prevents the valve from upshifting (moving leftward as shown in the drawing) even in the event that the solenoid associated with shift valve 2 is de-energized (as for example by computer controls) to exhaust solenoid oil from the left end of the "1-2" shift valve. This occurs because the flow of oil through passageway 4 defined in valve 2, and which flows to the left end of the valve 6, applies sufficient fluid pressure at the left end of the valve 6 to overcome any open exhaust condition resulting from de-energization of the exhaust solenoid associated with the "1-2" shift valve, and thereby prevent the "1-2" shift valve 6 from upshifting at rotational speeds of the engine which would otherwise cause the "factory installed" transmission to upshift. A check ball, designated by reference numeral 8 in FIG. 2 of the drawing, is provided at the left end of the "2-3" shift valve 2 to prevent solenoid oil pressure from exhausting to atmosphere when the gear selector is not in the "1" or First Gear position. (See FIG. 3 of the drawing). A spring 10 provided at the stem end of the shift valve 2 retains the check ball 8 at its operating position on the valve.

Although the solenoid associated with "1-2" shift valve does not exhaust fluid at the left end of the valve to cause the valve to upshift when the gear selector is in the "1" First Gear position, computer controls of the vehicle will cause the solenoid to de-energize and exhaust the solenoid oil at the left end of the "1-2" shift valve when a predetermined rotational engine speed is exceeded. However, the modifications to the hydraulic system of the E40D transmission in accordance with the present invention prevent the "1-2" shift valve from upshifting even when the exhaust solenoid associated with this valve is de-energized, as a result of the fluid pressure applied to the left end of the "1-2" valve caused by fluid flowing from the "2-3" shift valve. The "1-2" valve is maintained in a downshifted (rightwardly oriented position as shown in FIGS. 2–3 of the drawing) until the gear selector lever is moved out of the "1" first gear position. When the gear selector lever is moved out the "1" position, manual low/1st oil is exhausted at the manual valve, designated by reference numeral 12 in FIGS. 2–3 of the drawing. When the gear selector lever is in the second position, the solenoid associated with the "1-2" shift valve 6 (See, for example, FIG. 2 of the drawing) is not energized, permitting solenoid oil to exhaust from the left end of the "1-2" shift valve. This results in movement of the "1-2" shift valve in a leftward direction (as shown in FIGS. 2–5 of the drawing) under the urging of a spring acting on the right end of the "1-2" shift valve. As a result of the exhausting of fluid at the left end of the "1-2" shift valve, the force acting on the left end of the valve as a result of fluid pressure applied thereto is decreased such that the resilient force of the spring acting on the right end of the valve dominates, causing the valve to move to the left. Movement of the valve in a leftward direction permits the transmission to upshift to second gear. The original "factory installed" hydraulic system of the E40D transmission holds second gear as long as the gear selector lever is in the "2" position, holds 3rd gear as long as the gear selector lever is in the "D" drive, and holds 4th gear when the vehicle is operating in Overdrive. Operation of the "factory installed" E40D transmission in 2nd gear, 3rd gear and 4th drive (Overdrive) gears is accomplished by means of electronic controls, and said operation is known to those skilled in the relevant art. Attention is also directed to the aforementioned Ford publication for a more detailed description of the operation of the "factory installed" E40D transmission.

In accordance with a further feature of the present invention, the E40D "factory installed" transmission for stick shift manual operation is modified to enable the driver to manually select any gear ratio at any time during operation of the vehicle (i.e., without regard to actual vehicle speed or rotational engine speed) without employing computer controls. This modification requires the removal of the factory installed "2-3" shift valve, the installation of a new "2-3" shift valve including a 3/16 inch checkball and a spring on the stem end of the new valve (See FIGS. 2–3 of the drawing), removal of the "factory installed" "3-4" shift valve, and installation of a new "3-4" shift valve using the "factory installed" spring for the original "3-4" shift valve. (See FIG. 3). Attention is also directed to the portion of the aforementioned Trango publication, entitled "E40D-Stick Valve Body".

The "stick shift" or "manually operated" transmission design functions without electronic controls. To allow for manual control of upshifts and downshifts with adequate mainline pressure, and without a controlling computer (as for example, on hot rods or on other race car vehicles in which manual shifting of gears occurs), the command wires to the appropriate shift solenoids and EPC solenoid (the pressure regulator) must be disconnected. When this occurs, solenoid oil is absent from the left end of the shift valves associated with each solenoid (since all solenoids are open to exhaust), thereby causing mainline pressure to achieve its maximum value. First gear position is held as a result of the action of a new "2-3" shift valve, the operation thereof having been previously discussed herein, enabling the driver to achieve first gear at any rotational speed of the engine.

In the 2nd or "2" position of the manual gear selector, solenoid pressure is absent from the new "2-3" shift valve, designated by reference numeral 2 in FIGS. 2–3 of the drawing. The valve 2 is prevented from upshifting, (i.e., moving in a leftward direction as indicated in the drawings) by 2nd oil acting on the second land from the left to hold the "2-3" shift valve in its rightward position. When the gear shift lever is moved into the "3" or "D" position, 2nd oil is exhausted at the manual valve, and the spring at the right end of the "2-3" valve applies a resilient force on the right end of the valve (which overcomes the force applied by the 2nd oil pressure at the left end of the valve which has now been exhausted at the manual valve), resulting in movement of the "2-3" valve to the left upshifting the transmission into 3rd gear.

Attention is also invited to the portion of the aforementioned Trango publication entitled "E40D—Stick Valve Body" illustrating the new "2-3" valve installed in accordance with the present invention, including the ball associated therewith and the use of the spring from the original factory installed "2-3" valve. The second and third lands (as viewed from the left of FIG. 1 of the drawing illustrating the "factory installed" transmission) have been redesigned into a single, longer land in accordance with a further aspect of the present invention (See FIGS. 2–3 of the drawing and the sketch of the "2-3" shift valve in the portion of the Trango Publication entitled "E40D—Stick Valve Body".) The purpose of the redesign of the lands is to cut off line pressure applied to the left end of the "3-4" shift valve, designated by reference numeral 14 in FIGS. 2–3 of the drawing, thereby permitting the "3-4" shift valve to remain in its leftward position (as seen in FIGS. 2–3 of the drawings), until 4th gear is selected by the operator of the vehicle. In order to achieve a "3-4" upshift, it is necessary to energize the approprate solenoid (the number 2 solenoid in the "factory installed" transmission) to achieve a "3-4" upshift. The solenoid is energized by applying 12 volts of electrical potential to the number 2 solenoid through a manual toggle switch. Accordingly, the E40D transmission, when operated in its stick shift manual mode, is run with no electronic controls from a computer so that 4th gear is attained as a result of the manual actuation of an electrical switch to energize a solenoid. The new "3-4" shift valve in accordance with the present invention has also been redesigned to move in a rightward direction (as seen on FIGS. 2–3 of the drawing) as compared to the "factory installed" 3-4 shift valve which moves in a leftward direction when upshifting into 4th gear. This revision is made so that it is possible to achieve 4th gear by energizing the number 2 solenoid which is associated with the "3-4" shift valve and causes the valve to move in a rightward direction as seen in the drawings.

As a result of the modification to the "3-4" shift valve discussed above, this valve no longer has line pressure applied on the number 2 land (the second land from the left as shown in FIG. 3 of the drawing.) As discussed above, the re-design of the "2-3" shift kit valve eliminates the application of line pressure to the left end of the new "3-4" shift valve in accordance with the present invention. By eliminating the portion of the factory installed hydraulic circuit which applied line pressure to the left end of the "3–4shift valve" , the first land on the left end of the new "3–4 shift valve" installed in accordance with the present invention can be ground to 0.020 inches undersize. Reference numeral 15 in FIG. 3 of the drawing illustrates the undersized first land on the "3-4" shift valve designated by reference numeral 14. In this manner, any fluid that might become trapped between the first and second lands (as viewed from the left in the drawings) on the new "3-4" shift valve in accordance with the present invention, will be exhausted as a result of the undersize in the first land. This, in turn, will prevent any fluid trapped between the first and second lands from holding the "3-4" shift valve in its rightward position as viewed in FIGS. 2–3 of the drawing. Accordingly, the entire circuit of the number 2 solenoid (the solenoid associated with the "3–4 shift valve") provides means for exhausting at the left end of the modified "3–4 shift valve" installed in accordance with the present invention.

If the driver of the vehicle wishes to maintain the ability to achieve first gear at any engine speed (in accordance with the first objective of the invention as discussed above), yet desires automatic upshifts and downshifts and thus not operate the vehicle in stick shift manual operation, the new "3-4" shift valve, which has been provided for manual operation as described above, is removed and replaced with original "factory installed" "3-4" shift valve and the original factory installed "3-4" shift valve spring. The new "2-3" shift valve also described above, which was installed for manual operation, is removed, and the new "2-3 shift valve" adapted for automatic operation in accordance with the present invention, is installed. As previously discussed herein, the new "2-3 shift valve" for automatic operation is further modified for manual operation by redesigning the second and third lands from the left as seen in the drawing figures into a single longer land. It is necessary to replace the manual operation "2-3 shift valve" with the automatic "2-3 shift valve" when converting the hydraulic system back to automatic shifts as a result of the reverse nature of the operation of the "3-4 shift valve" for manual stick shift operation, as described herein. This allows conversion back to automatic by changing the "2-3" and the "3-4" shift valves, which were redesigned for manual operation, to the appropriate design of the valves for automatic operation, as previously discussed herein.

In a further aspect of the present invention, the "factory installed" E40D transmission is modified to produce quick apply forces and release forces within minimum ratio sharing (overlap) to result in high performance operation of the modified transmission with correctly timed shifts. This objective is achieved by modification of the E40D "factory installed" transmission, discussed as follows.

The minimum and maximum mainline pressure is increased. As discussed at page 4, item B of the Trango Publication (E40D-HD2 REPROGRAMMING KIT), a spring is provided to increase maximum mainline pressure by approximately twenty pounds per square inch (psi), while a new boost assembly designated by reference numeral 16 in FIG. 2 provides higher line modulator pressure at mid to wide open throttle for providing firmer shifts. The spring acts on the boost valve of the factory installed transmission to enable the new boost valve assembly 16 to furnish line modulator pressure greater than in the factory installed transmission.

The new boost assembly 16 in accordance with the present invention is larger in diameter than the "factory installed" boost assembly, and is calibrated with tapered springs. The boost assembly 16 is sensitive to EPC (electronic pressure control) from the EPC solenoid, and the EPC solenoid is sensitive to throttle opening which provides a signal (through change in oil pressure) to the boost assembly 16 to increase line modulator pressure applied to the accumulator valves of the factory installed transmission to result in firmer shifts than are otherwise provided by the unmodified factory installed transmission.

In a further aspect of the invention, the factory installed E40D transmission is modified to provide firmer and more correctly timed shift by enlarging three orifices, preferably to a diameter of 0.081 inches, as designated by reference numeral 18 in FIG. 3 of the drawing. The modified orifices are the third exhaust, the intermediate band apply, and the intermediate band (apply and exhaust) of the factory installed transmission. Attention is directed to page 2, step 5 of the Trango Publication, entitled "E40D-HD2 REPROGRAMMING KIT". The tension springs for the second, third and fourth accumulators are modified to provide for shorter shifts. See page 1, step 3 of the Trango Publication entitled "E40D-HD2 REPROGRAMMING KIT".

Referring to FIG. 3 of the drawing, reference numeral 20 designates a spring acting as a shim for preventing the "4-3-2" manual timing valve (designated as reference numeral 22) from moving in a stroking motion. In this manner, reverse delayed engagement is reduced by a reduction in the quantity of pump volume necessary to stroke the manual timing valve 22. Attention is also directed to page 1, step 2 of the Trango Publication entitled "E40D-HD2 REPROGRAMMING KIT". In accordance with a further aspect of the present invention, a spring is provided for applying a resilient force to the converter valve of the factory installed E40D transmission to raise torque converter pressure (See, page 4, item A of the Trango Publication entitled "E40D-HD2 REPROGRAMMING KIT" ). Increased torque converter pressure increases lockup capacity which enhances the durability of the torque converter.

Referring to page 4, item D of the Trango Publication entitled "E40D-HD2 REPROGRAMMING KIT", an opening is drilled into the converter cover to provide an exhaust for cover pressure. Such cover pressure in the factory installed transmission detracts from (and opposes) the apply pressure during lockup, to provide a smooth lockup engagement. By drilling and exhausting the cover side pressure, less resistance is provided to the apply pressure during lockup, thereby resulting in firmer engagement and increased durability of the torque converter.

Referring to page 4, item E of the Trango Publication entitled "E40D-HD2 REPROGRAMMING KIT", a passage 24 (as shown in FIG. 3 of the drawing) is drilled to permit line pressure to bypass the pressure regulator valve (designated by reference numeral 26 in FIG. 3 of the drawing) of the factory installed hydraulic circuit in the event that the pressure regulator valve 26 fails to open during operation of the transmission.

In accordance with the present invention as described herein, the hydraulic circuitry of a "factory installed " E40D transmission produced by the Ford Motor Company is modified to improve the overall performance thereof. The improvements include modifications to permit the operator of a vehicle to select and achieve first gear without regard to rotational speed of the engine or actual speed of the vehicle; to enable the operator of the vehicle to select any gear ratio at any time without computer controls when the transmission is in a stick shift—manual operation mode; and to modify fluid pressure and/or direction of fluid flow within the factory installed transmission to result in quick applies and releases with minimum ratio sharing (overlap) thereby providing firmer and more correctly timed shifts.

Other modifications and improvements within the scope of the invention will become apparent to those skilled in the relevant art. Accordingly, the discussion of the preferred embodiments of the invention herein has been intended to be illustrative only, and not restrictive of the scope of the invention, that scope being defined by the following claims and all equivalents thereto.

I claim:

1. A method for modifying the hydraulic circuitry of an automotive transmission including a manual valve coupled in fluid flow relationship to a "1-2" shift valve, and to a "2-3" shift valve; said manual valve being coupled to a gear selector; said method comprising the steps of:

providing a fluid flow path through said "2-3" shift valve; and coupling the "2-3" shift valve in fluid flow relationship to the "1-2" shift valve to provide fluid flow from said "2-3" shift valve to a predetermined end of said "1-2" shift valve for applying a fluid pressure of sufficient magnitude on said predetermined end of said "1-2" shift valve to maintain said "1-2" shift valve in a downshifted position when said gear selector is in a first gear position.

2. The method as claimed in claim 1 further including the step of coupling said "2-3" shift valve to said "1-2" shift valve by providing a passageway connecting said fluid flow path defined in said "2-3" shift valve with said predetermined end of said "1-2" shift valve.

3. The method as claimed in claim 1 further including the step of providing a fluid flow path in said "2-3" shift valve for permitting fluid flow through said "2-3" shift valve for exerting an applied fluid pressure on said "2-3" shift valve to maintain said "2-3" shift valve in its downshifted position when said gear selector is in a first gear position.

4. The method as claimed in claim 1 further including the step of providing fluid flow from said "2-3" shift valve to said "1-2" shift valve at a sufficient rate to apply a sufficient pressure to said predetermined end of said "1-2" shift valve to maintain said "1-2" shift valve in a downshifted position for overcoming an open exhaust valve operatively associated with said "1-2" shift valve.

5. The method as claimed in claim 4 further including the step of providing fluid flow from said "2-3" shift valve to said "1-2" shift valve at a sufficient rate for applying a sufficient fluid pressure to said predetermined end of said "1-2" shift valve to overcome the resilient force of a spring applied on an end of said "1-2" shift valve opposite to said predetermined end of said "1-2" shift valve, said resilient force applied in a direction for urging said "1-2" shift valve towards its upshifted position.

6. The method as claimed in claim 4 wherein said fluid flow to said "1-2" shift valve is provided from said fluid flow path defined within said "2-3" shift valve.

7. The method as claimed in claim 5 wherein said fluid flow to said "1-2" shift valve is provided from said fluid flow path defined within said "2-3" shift valve.

8. The method as claimed in claim 1 further including the step of providing means for preventing an exhaust valve operatively associated with said "2-3" shift valve from permitting fluid to exhaust therefrom when said gear selector is not in a first gear position.

9. The method as claimed in claim 8 wherein said means for preventing comprises a check ball operatively associated with said exhaust valve operatively associated with said "2-3" shift valve.

10. The method as claimed in claim 1 further including the step of exhausting fluid from said "1-2" shift valve to permit said "1-2" shift valve to upshift once said gear selector is moved out of a first gear position.

11. The method as claimed in claim 10 further including the step of exhausting said fluid from said "1-2" shift valve through said manual valve coupled thereto in fluid flow relationship when said gear selector is moved out of said first gear position.

12. The method as claimed in claim 10 further including the step of exhausting said fluid from said "1-2" shift valve through said manual valve by actuating a valve operatively associated with said "1-2" shift valve.

13. The method as claimed in claim 12 wherein said valve operatively associated with said "1-2" shift valve is a solenoid valve, said method further including the step of actuating said solenoid valve to exhaust said "1-2" shift valve by an adjustment of an electrical signal applied to said solenoid valve.

14. A method for modifying the hydraulic circuitry of an automotive transmission including a manual valve coupled in fluid flow relationship to a "1-2" shift valve, and to a "2-3" shift valve; said manual valve being coupled to a gear selector; said method comprising the steps of:

providing a fluid flow path through said "2-3" shift valve;

coupling said "2-3" shift valve in fluid flow relationship to said "1-2" shift valve to provide fluid flow to a predetermined end of said "1-2" shift valve for applying a fluid pressure of sufficient magnitude on said predetermined end thereof to overcome an open exhaust valve operatively associated with said "1-2" shift valve and maintain said "1-2" shift valve in a downshifted position when said gear selector is in a first gear position; and exhausting said "1-2" shift valve to permit said "1-2" shift valve to upshift when said gear selector is moved out of said first gear position.

15. The method as claimed in claim 14 further including the step of exhausting said "1-2" shift valve at said predetermined end thereof when said gear selector is moved out of said first gear position.

16. The method as claimed in claim 14 further including the step of exhausting said "1-2" shift valve through said manual valve coupled in fluid flow relationship thereto, when said gear selector is moved out of said first gear position.

17. The method as claimed in claim 14 wherein said "1-2" shift valve is coupled in fluid flow relationship to said "2-3" shift valve by coupling said fluid flow path provided in said "2-3" shift valve to said predetermined end of said "1-2" shift valve.

18. A method for modifying the hydraulic circuitry of an automotive transmission including a manual valve coupled in fluid flow relationship to a "1-2" shift valve, a "2-3" shift valve, and a "3-4" shift valve; said manual valve being coupled to a gear selector; said method comprising the steps of:

providing said "2-3" shift valve with a land for preventing the application of line pressure to a predetermined end of "3-4" shift valve for permitting said "3-4" shift valve to remain in a downshifted position until a 4th gear position is selected.

19. The method as claimed in claim 18 further including the step of selecting said 4th gear position by energizing a solenoid operatively associated with said "3-4" shift valve.

20. The method as claimed in claim 18 wherein said "3-4" shift valve includes at least first and second adjacent lands, said method further including the step of providing said first land with a smaller diameter than said second land for permitting exhaust of fluid between said first and second lands through said smaller first land.

* * * * *